United States Patent

Mak

[11] Patent Number: 5,960,212
[45] Date of Patent: Sep. 28, 1999

[54] UNIVERSAL INPUT/OUTPUT CONTROLLER HAVING A UNIQUE COPROCESSOR ARCHITECTURE

[75] Inventor: Simon Chung-Tong Mak, Pomona, Calif.

[73] Assignee: Telefonaktiebolaget LM Ericsson (publ), Stockholm, Sweden

[21] Appl. No.: 08/594,280

[22] Filed: Apr. 3, 1996

[51] Int. Cl.[6] .................................................. G06F 13/00
[52] U.S. Cl. ...................... 395/800.34; 395/883; 395/310
[58] Field of Search ............................ 395/800.3, 800.29, 395/800.34, 200.43, 678, 733, 739, 742, 882, 883, 884, 885, 886, 309, 310; 711/215, 217, 218, 129, 131, 149, 153

[56] References Cited

U.S. PATENT DOCUMENTS

| | | | |
|---|---|---|---|
| 3,593,299 | 7/1971 | Driscoll et al. | 395/866 |
| 3,766,526 | 10/1973 | Buchanan | 395/871 |
| 3,810,105 | 5/1974 | England | 395/863 |
| 3,976,977 | 8/1976 | Porter et al. | 711/215 |
| 4,060,849 | 11/1977 | Bienvenu et al. | 395/858 |
| 4,106,092 | 8/1978 | Millers, II | 395/884 |
| 4,162,520 | 7/1979 | Cook et al. | 395/821 |
| 4,189,769 | 2/1980 | Cook et al. | 395/821 |
| 4,293,909 | 10/1981 | Catiller et al. | 395/884 |
| 4,442,488 | 4/1984 | Hall | 711/125 |
| 4,758,946 | 7/1988 | Shar et al. | 711/206 |
| 4,979,102 | 12/1990 | Tokuume | 395/200.43 |
| 4,994,961 | 2/1991 | MacGregor et al. | 395/290 |
| 5,001,624 | 3/1991 | Hoffman et al. | 395/825 |
| 5,313,587 | 5/1994 | Patel et al. | 395/840 |
| 5,428,779 | 6/1995 | Allegrucci et al. | 395/678 |
| 5,471,597 | 11/1995 | Byers et al. | 711/215 |
| 5,471,600 | 11/1995 | Nakamoto | 711/5 |
| 5,524,223 | 6/1996 | Lazamavich et al. | 395/588 |

*Primary Examiner*—Larry D. Donaghue
*Attorney, Agent, or Firm*—Jenkens & Gilchrist, P.C.

[57] ABSTRACT

A coprocessing core is provided with a unique architecture wherein the register block of the coprocessor is divided into a plurality of sub-blocks containing registers. In indirect addressing of the register block, the value loaded into a base pointer points to a particular one of the plurality of sub-blocks and activates the registers therein for read-write access. Changing of the base pointer value using only a single instruction brings another set of registers in a sub-block into activation. Unless relatively accessed, read only access is available to the registers in the register block. This architecture advantageously facilitates single instruction context switching, non-stacked machine operation and low latency interrupt handling. The architecture, as well as the programmability of the coprocessing core, further facilitates use of the device in a universal input/output controller application for connection between a host processor and plurality of different types and kinds of peripheral devices.

21 Claims, 6 Drawing Sheets

UNIVERSAL INPUT/OUTPUT CONTROLLER HAVING A UNIQUE COPROCESSOR ARCHITECTURE

BACKGROUND OF THE INVENTION

1. Technical Field of the Invention

The present invention relates to input/output devices and, in particular, to a programmable input/output controller for connecting a plurality of peripheral devices of different types to a host processing system. The present invention further relates to architectures for processing systems and, in particular, to an architecture facilitating context switched addressing, non-stacked machine operations and low latency interrupt handling.

2. Description of Related Art

It is of well known system design for a host processing system to be connected through an input/output controller to a peripheral device (comprising, for example, a printer or a disk drive). Conventionally, system designers have relied on the use of highly dedicated and functionally specific controllers for interfacing the host processing system with the included peripheral devices. These controllers comprise direct memory access (DMA) controllers, small computer system interface (SCSI) controllers, multi-protocol serial communication controllers (SCCs) and disk controllers.

There are a number of known drawbacks to the continued use of such dedicated and specific input/output controllers in processing systems. First, because these controllers are typically standardized in design and manufactured for widespread commercial sale, it is difficult, if not impossible, to find a controller acceptable for use in a specialized application. Second, these controllers are designed to work only with a specific type of interface, and therefore cannot be used in conjunction with peripheral devices that do not support that specific interface type. Third, the trade-off for providing increased functionality in these controllers is typically a limitation on the number of channels available for connection to the peripheral devices. Other drawbacks of conventional controller design and operation are well known to those skilled in the art. Suffice it to say, however, that there is a need for a flexible/programmable controller capable of multiple channel operation in conjunction with a number of conventional and specialized peripheral devices and applications.

At the peripheral device level, data acquisition and transfer is bit or byte oriented and highly real time dependent, and thus controller designs tend to emphasize short response time and highly efficient operation. Conventional eight bit processor architectures implemented in input/output controllers, while possessing the advantages of programmability and flexibility of operation, simply are not capable of meeting the capacity and performance requirements of common controller design specifications. The current trend in processor architecture is then towards more and more powerful complex instruction set computing (CISC) designs having complicated addressing modes, large registers, larger address space and increased speed. However, CISC based processor systems provide unnecessary features not related to controller applications and are extraordinarily expensive rendering them unsuitable for use in input/output controllers. Another architecture providing programmability and flexibility of operation at a reasonable cost is accordingly needed for application to input/output controller design.

SUMMARY OF THE INVENTION

The input/output controller of the present invention facilitates the connection for data transfer between a host processor and plurality of different types and kinds of peripheral devices. A coprocessing core governs operation of the controller, and in accordance with its programming controls the input and output of peripheral data. The programmability of the coprocessing core enables the functionality of the controller to be selected to accommodate the functionality and data transfer characteristics and requirements of the attached peripheral devices.

The coprocessing core of the input/output controller is provided with a unique architecture that advantageously facilitates the single instruction context switching, non-stacked machine operation and low latency interrupt handling processing characteristics necessary for real time input/output controller applications. In accordance with the architecture, the register block of the coprocessing core is divided into a plurality of sub-blocks, and the individual registers in each sub-block are made accessible either directly or indirectly. In indirect addressing, the value loaded into a base pointer points to a particular one of the plurality of sub-blocks and activates the registers therein for read-write access. Changing of the base pointer value using a single instruction brings another set of registers in a sub-block into activation.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF THE INVENTION

Figure 1:
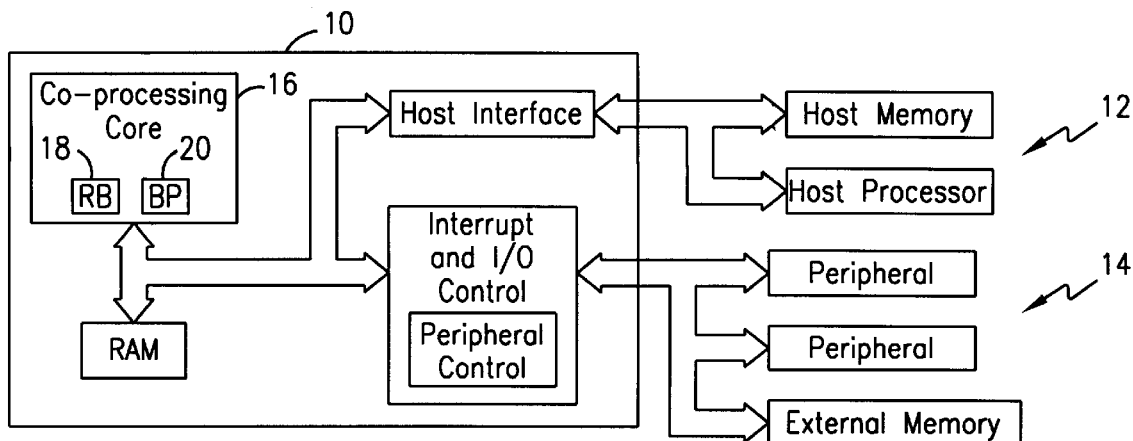
FIG. 1 is a block diagram of the input/output controller of the present invention.

Reference is now made to FIG. 1 wherein there is shown a block diagram of the input/output controller 10 of the present invention, wherein the controller functions as a flexible and programmable data interface between a host processing system 12 and a plurality of peripheral devices 14. The controller 10 operates in accordance with its programming and in response to commands sent from the host processing system 12 to perform input/output functions with respect to the peripheral devices 14. There are no fixed operations to be performed by the controller 10 other than those operations that the controller is programmed to perform. Accordingly, the programming of the controller 10 provides the flexibility of operation needed to handle the specific interface functionalities required by each of the various attached peripheral devices 14.

The operation of the controller 10 is governed by a coprocessing core 16 comprising a sixteen bit processor architecturally designed for efficient peripheral input/output handling, data capturing, and data formatting and deformatting operations. The coprocessing core 16 is of conventional digital microprocessor design including instruction registers, an address register, a write back register, an instruction decode unit, timing control, an arithmetic logic unit, and bus arbitrator (all not shown). A register block 18 and a base pointer 20, however, are also included, and are organized and used in a unique way that facilitates single instruction context switching, non-stacked machine operation, and low latency interrupt handling. The register block 18 is sixteen bits wide and has two-hundred fifty-six locations (i.e., registers or physical addresses) (r0–r255) therein available for storing sixteen bit words. Read-write access to any of the registers in the register block 18 is made in one mode by accessing a particular register relative to the contents of the base pointer 20 whose value is set by the execution of a simple instruction. Read-only access to any of the registers in the register block 18 is made in another mode by accessing a particular register directly by specifying its physical address. Writing to the registers is not permitted unless accessed in accordance with the relative addressing scheme.

Figure 2:
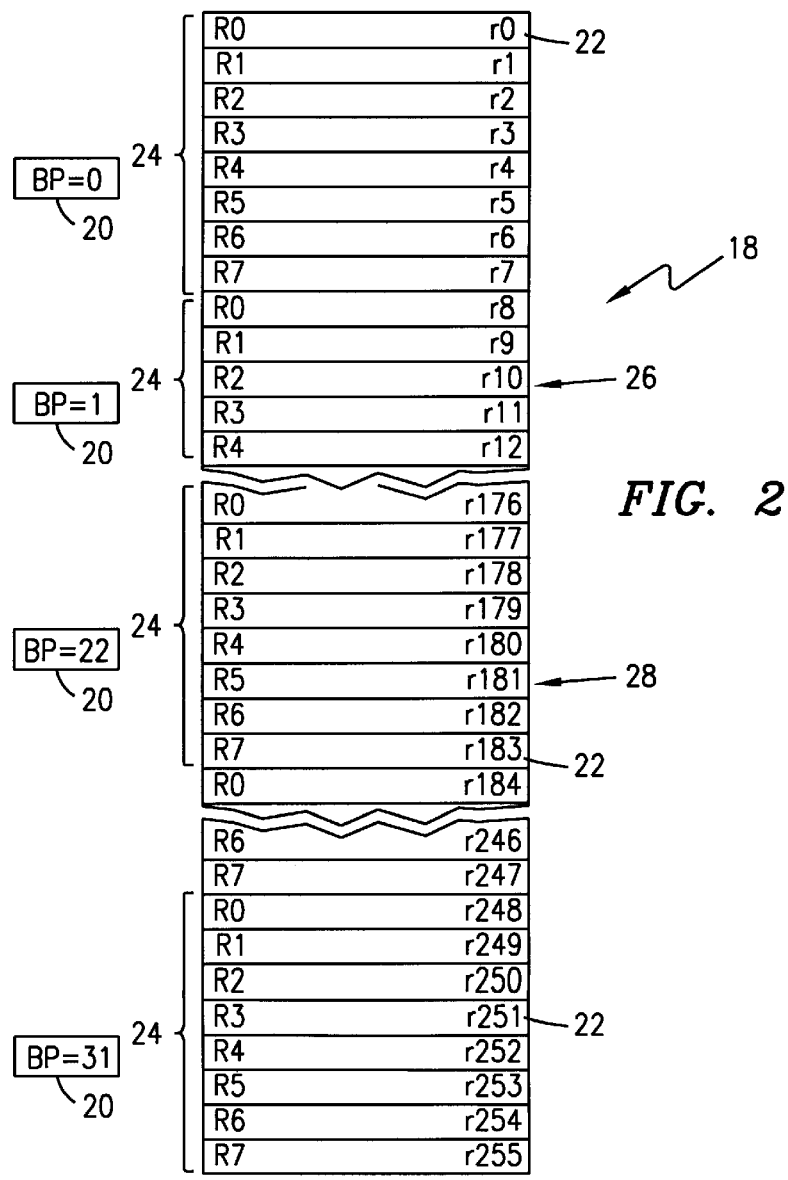
FIG. 2 illustrates the organization of the register block with respect to the relative addressing scheme implemented by the coprocessing core of the input/output controller of the present invention.

With reference now to FIG. 2, and in accordance with the relative addressing scheme, the setting of a particular value in the base pointer 20 makes eight certain relative ones (R0–R7) of the two-hundred fifty-six included registers 22 in the register block 18 available for read-write access. Thus, the register block 18 is accordingly divided into thirty-two sub-blocks 24 containing eight registers 22 each, with all registers in one sub-block accessible through relative addressing by setting a particular value in the base pointer 20 relating to a particular sub-block. Each change of the value of the base pointer 20 accordingly activates another sub-block 24 containing eight relative registers (R0–R7). Because the relative addressing scheme provides the only means for writing to a certain one of the registers 22, the values stored in the registers associated with a given value for the base pointer 20 are write-protected when the value of the base pointer is changed, and thus the data cannot be tampered with until the next time that given value is again selected for the base pointer.

The particular one (rx) of the registers 22 in a sub-block 24 of the register block 18 accessed in accordance with the relative addressing scheme implemented by the coprocessing core 16 is determined by the following formula:

$$rx=(8 \times BP)+Rn$$

wherein: BP is the selected value of the base pointer (from 0 to 31) that identifies the sub-block 24 of interest, and Rn is the selected relative register (from 0 (for R0) to 7 (for R7)) being accessed in that sub-block. Accordingly, if the base pointer 20 value is selected as one (BP=1), and the third (R2) relative register (Rn=2) is selected of interest, then the particular register (rx) addressed is register 22 (r10) in the second sub-block 24 (where (8×1)+2=10) as generally indicated at 26. Similarly, if the base pointer value is twenty-two (BP=22), and the sixth (R5) relative register (Rn=5) is of interest, then the particular register (rx) addressed is register 22 (r181) in the twenty-third sub-block 24 (where (8×22)+5=181) as generally indicated at 28.

Figure 3:
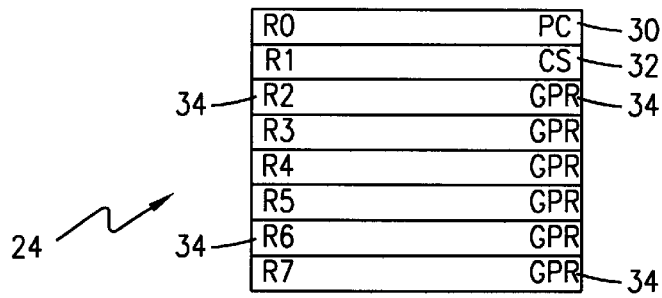
FIG. 3 illustrates the registers within each sub-block of the relative registers in the coprocessing core of the input/output controller of the present invention.

Referring now to FIG. 3, there is illustrated the particular operation and data uses of the registers 22 within each sub-block 24 of relative registers (R0–R7). The first relative register (R0) in each sub-block 24 comprises the program counter (PC) register 30 pointing to the location of the next programming instruction to be executed by the coprocessing core 16. The second relative register (R1) in each sub-block 24 comprises the control status (CS) register 32 storing both the current value and the most recent prior value of the base pointer 20. The most recent prior value of the base pointer 20 stored in the control status register 32 identifies the sub-block 24 of relative registers (R0–R7) most recently accessed by the coprocessing core 16 before the accessing of the current sub-block. The remaining relative registers (R2–R7) in each sub-block 24 comprise general purpose registers (GPRs) 34 used for data storage and addressing purposes.

Figure 4:
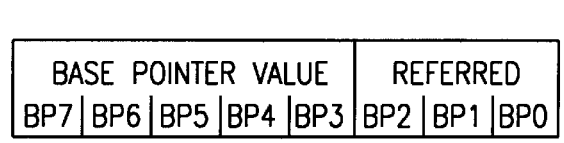
FIG. 4 is a format diagram for the base pointer in the coprocessing core of the input/output controller of the present invention.

Reference is now made to FIG. 4 wherein there is shown a format diagram for the base pointer 20. The base pointer 20 is an eight bit register wherein five of the bits (BP3–BP7) are used to contain the value of the base pointer. As discussed above, the value of the base pointer provides the base reference for relatively addressing the registers 22 of the register block 18 through an identification of which one of the available sub-blocks 24 is of interest. Most of the programming instructions executed by the coprocessing core 16 utilize the relative addressing scheme.

The remaining three bits (BP0–BP2) of the eight bit base pointer 20 are "referred by instruction". By this it is meant that these bits are not accessible via an instruction. Instead, these bits are reserved for use as the relative register (R0–R7) address. During execution of an instruction, the involved address for the relative register is loaded into BP0–BP2. Then, together with BP3–BP7, the actual register in the register block 18 can be accessed.

Figure 5:
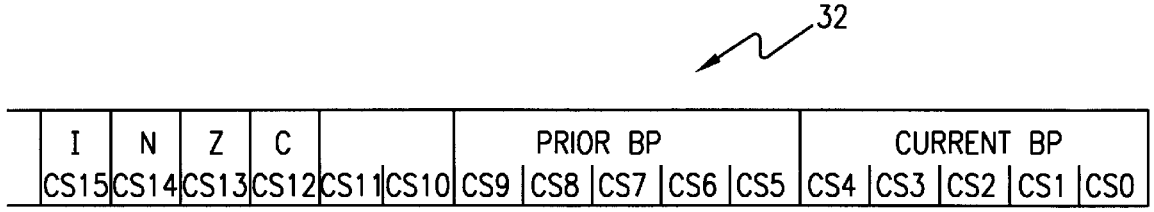
FIG. 5 is a format diagram for the control status register within each sub-block of the relative registers in the coprocessing core of the input/output controller of the present invention.

Referring now to FIG. 5, there is shown the format diagram for the control status register (CS) comprising the second register (R1) 22 within each sub-block 24 of the relative registers (R0–R7). Like the other registers 22 in the register block 18, the control status register (CS) in each sub-block 24 is a sixteen bit register. The first five bits of the register (CS0–CS4) comprise a first field 36 containing the currently active value of the base pointer 20. The second five bits of the register (CS5–CS9) comprise a second field 38 containing the most recent previously active (prior) value of the base pointer 20. The last four bits of the register (CS12–CS15) comprise a carry (C) flag, a zero (Z) flag, a negative (N) flag, and an interrupt (I) flag. Bits CS10 and CS11 are reserved for use with interrupt flag (I) bit CS12 for the implementation of multiple interrupt levels, if needed. The control status registers (CS) in the sub-blocks 24 are updated only by the coprocessing core 16. Read only access to the control status registers is allowed in response to the execution of a programming instruction.

It is well known in a multi-tasking operating system that one important processor function is the performance of preemptive scheduling wherein one task being performed is interrupted and switched with (preempted by) another more important task. The first task is then not completed until after the preempting task is completed. The processes for executing this task preemption operation and thereafter returning to execution of the original task are referred to as context switching. In a conventional processing system, context switching requires an excessive amount of time and memory space to complete due to the fact that the context (i.e., addresses, data, pointers, etc.) of the currently executing task must be switched with the context of the preempting task, saved for later access, and then switched back following preempting task completion.

The particular architecture of the controller 10 and coprocessing core 16 described above in connection with FIGS. 2–5 facilitates the provision of an efficient, built-in physical context switching operation. By advantageously using the base pointer 20 and the relative addressing scheme described above, the physical context switching operation is performed by executing a single instruction. This instruction need only specify a new value for the base pointer 20. For example, any given instruction could include a special bit designating that the value of the base pointer 20 be automatically incremented by one following completion of the instruction execution step. Alternatively, an instruction, executed on its own, as a result of an interrupt detection, or as a result of a function call, could specify a particular new value to be loaded into the base pointer 20. The effect in either case of the presence of a new value in the base pointer 20 is to switch the physical context of system operation in one step by activating a new sub-block 24 containing a new program counter (PC) value pointing towards a next instruction to be executed by the coprocessing core 16. In order to enable a return to the prior context, the previous value of the base pointer 20 is stored in the control status register (CS) of the currently activated sub-block 24, with the previously activated sub-block storing the program counter and other data relating to the prior task for later use following a return.

Figure 6:
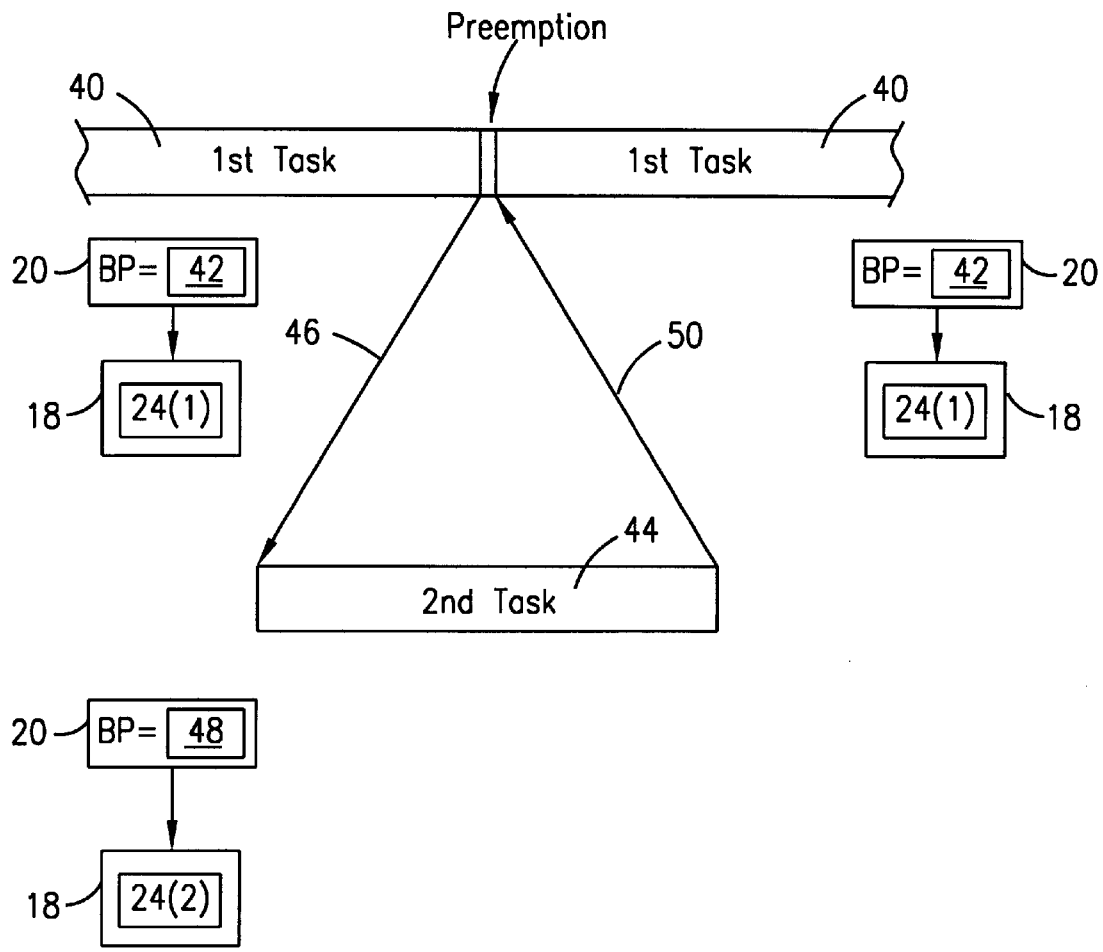
FIG. 6 illustrates an exemplary single execution step context switching operation in accordance with the present invention.

The single execution step context switching operation provided by the present invention may be better understood through a specific example as illustrated in FIG. 6. Consider a first processing task 40 being executed with reference to a first sub-block 24 (1) of the register block 18 identified by a first value 42 loaded into the base pointer 20. When preemption of the first task 40 by a second task 44 occurs (perhaps through an execution command, an interrupt, or a function call), the preemption is effectuated by simply executing a single instruction step physical context switching operation 46 that changes the value of the base pointer 20 to a second value 48. This change activates a second sub-block 24 (2) whose first relative register (R0) contains the program counter (PC) identifying the location of the next to be executed instruction in the second task 44. At the same time, the first base pointer value 42 is loaded into the second field 38 of the control status register (CS) for the second sub-block 24 and saved therein for later retrieval. Importantly, while the second sub-block 24 (2) is activated, the first sub-block 24 (1) is write-protected against data modification due to its read only status, and thus the state, i.e. context, of the first task 40 data stored therein (including the program counter) remains intact while the second task 44 is being completed. Following completion of the second task 44, the first base pointer value 42 is retrieved from the second field 38 and loaded into the base pointer 20 again by executing a single instruction step physical context switching operation 50. This activates the first sub-block 24 of the register block 18 relevant to the continued execution of the first task 40, with the first relative register (R0) in the first sub-block containing the program counter (PC) value pointing to the location of the next instruction in the first task 40 (as of the point of the preemption operation 46) to be executed by the coprocessing core 16.

It is also well known for conventional processors to have an architecture that while allowing free use of memory space still retains stacked operations during function calls and handling of interrupts. By stacked operations, it is meant that the processor saves the returning address and needed register data on the stack prior to executing the next function. The stack is generally a portion of the read/write memory for the processor. Stacked operations further require reversal of the stacking procedure to return to the original address following next function completion. Stacked processing architectures are, however, inefficient solutions for real time processing environments as the instruction executions involved in pushing and pulling data to and from the stack increase execution time and complexity. For example, access time to a stack located in external memory may take seventy to one-hundred twenty nanoseconds. Furthermore, use of an expensive memory management device is required in order to prevent stack corruption or overflow.

The particular architecture of the controller 10 and coprocessing core 16 described above in connection with FIGS. 2–5 also facilitates the operation of the controller 10 and its coprocessing core 16 as a non-stacked machine. With a non-stacked machine operation, stack corruption and overflow concerns are obviated, memory management devices are not needed, and access time may be as short as a few nanoseconds.

By advantageously using the base pointer 20 and the relative addressing scheme described above, function calling and interrupt handling is effectuated in a non-stacked machine manner with the execution of a single instruction that changes the value of the base pointer 20 and activates a new sub-block 24 of the register block 18 much like that indicated in FIG. 6. Protection of the registers 22 in the previously used sub-block 24 is automatically provided. The value of the base pointer identifying the prior sub-block 24 is stored in the second field 38 of the control status register (CS) for later retrieval and loading into the base pointer 20 to activate the prior sub-block. Parameter passing and return value access is made through data storage in the general purpose registers (GPRs) of the sub-blocks 24 or through use of a common variable in memory.

Interrupt handling in a conventional processing architecture involves responding to the interrupt by first pushing the program counter and control status register onto the stack. Next, a vector responsive to the interrupt is read from a specific location in memory, and applied to branch execution by the processor to an interrupt service routine. All registers needed after servicing of the interrupt must also be pushed onto the stack and saved. Following handling of the interrupt, the procedure is reversed to return the processor to its prior state. The interrupt latency experienced with the pushing and pulling of data and the retrieval and application of the interrupt vector is, however, quite large, and therefore particularly unsuited for use in real time processing environments like that needed in an input/output controller 10.

The particular architecture of the controller 10 and coprocessing core 16 described above in connection with FIGS. 2–5 efficiently handles interrupt servicing in a low latency manner. The device signaling an interrupt towards the coprocessing core 16 transmits an interrupt request signal and a five bit vector value relating to the interrupt service routine. In response to receipt of the request signal, the vector value is simply loaded into the base pointer 20 to activate an interrupt service routine sub-block 24 in the register block 18. The value of the base pointer identifying the sub-block 24 activated prior to the interrupt is stored in the second field 38 of the control status register (CS) in the new sub-block for later retrieval and loading into the base pointer 20 following completion of the interrupt servicing. With the operational advantages provided by the relative addressing scheme, the process of switching to the interrupt service routine is accordingly efficiently accomplished in a very few number of clock cycles.

The coprocessing core 16 supports a number of addressing modes for its assembly instructions. In relative register mode, as discussed above, instructions executed by the coprocessing core 16 make reference to registers 22 in the register block 18 relative to a value stored in the base pointer 20. The syntax "Rn" is used to represent the relative register addressing mode in an instruction, wherein Rn specifies one of the relative registers (R0–R7) in the sub-block 24 designated by the current value of the base pointer 20.

In absolute register mode, also as discussed above, instructions executed by the coprocessing core 16 specifically identify by its physical address one of the two-hundred fifty-six registers 22 in the register block 18. The syntax "rx" is used to represent the absolute register addressing mode in an instruction, wherein rx identifies the one of the registers 22 (r0–r255) in the register block 18 to be accessed for addressing irrespective of the current value of the base pointer 20. This addressing mode is available only for reading from the register 22. Write operations to a register 22 must use one of the supported relevant addressing modes.

In register indirect mode, instructions executed by the coprocessing core 16 obtain a physical address in random access memory (RAM) or read only memory (ROM), i.e., outside the register block 18, by way of a particular relative register (R0–R7). The syntax "(Rn)" is used to represent the register indirect addressing mode in an instruction, wherein Rn specifies one of the relative registers (R0–R7) in the sub-block 24 designated by the current value of the base pointer 20, and the parentheses specify that the identified relative register will contain a physical address in memory to be accessed.

In immediate value mode, instructions executed by the coprocessing core 16 specify a specific value to be assigned to one of the general purpose registers (R2–R7) in the sub-block 24 designated by the current value of the base pointer 20. The syntax "#value" is used to represent the immediate value addressing mode, wherein #value specifies the value to be assigned to the selected one of the registers identified in the instruction.

In the direct mode, instructions executed by the coprocessing core 16 specifically identify by its physical address one of the locations in RAM or ROM to be accessed. The syntax "@address" is used to represent the direct addressing mode, wherein @address specifies the physical address location in memory to be accessed by the instruction.

In register indirect with displacement mode, instructions executed by the coprocessing core 16 identify the effective address by summing an indirectly specified physical memory address with a displacement value. The syntax "disp(Rn)" is used to represent the register indirect addressing with displacement mode in the instruction, wherein (Rn) specifies, as discussed above with respect to the register indirect addressing mode, a physical address in the register block 18 with respect to a relative register (R0–R7) in a sub-block determined by the current value of the base pointer 20, and disp specifies a sixteen bit value to be added to the determined physical address that identifies the physical address in memory to be accessed.

In register indirect mode with postincrement or predecrement, instructions executed by the coprocessing core 16 identify the effective address in accordance with the register indirect addressing mode discussed above, but will increment by one relative register in the postincrement mode, and decrement by one relative register in the predecrement mode. The syntax "(Rn)+" is used to represent register indirect addressing mode with postincrement in the instruction, wherein (Rn) indirectly identifies a physical address in memory, and the plus sign indicates that the physical address should be subsequently incremented by one. The syntax "-(Rn)" is used to represent register indirect addressing mode with predecrement in the instruction, wherein (Rn) indirectly identifies a physical address in memory, and the minus sign indicates that the physical address should be preceedingly decremented by one.

In register indirect with index mode, instructions executed by the coprocessing core 16 identify the effective address by summing two physical addresses determined from register indirect addressing as previously described. The syntax "(Rb,Ri)" is used to identify register indirect addressing with index mode in the instruction, wherein Rb is the relative register (R0–R7) containing the base physical address, and Ri is the relative register containing the index physical address, and the parentheses indicate that register indirect addressing is to be used with respect to both Rb and Ri to obtain the physical addresses.

In bit field mode, there is no byte or word boundary. The addressing space is treated by the coprocessing core 16 as a field of continuous bits starting from bit zero at a given base address. The instruction executed by the coprocessing core 16 then accesses any number of bits (up to sixteen) within the identified bit field space. The syntax "size(Rb,Rf)" is used to identify bit field addressing mode in the addressing instruction, wherein size identifies the number of bits to be accessed, and (Rb,Rf) identifies through indirect addressing mode the effective address of the first of the bits to be accessed in terms of a base physical address (from Rb) and an offset physical address (from Rf).

Figure 7A:
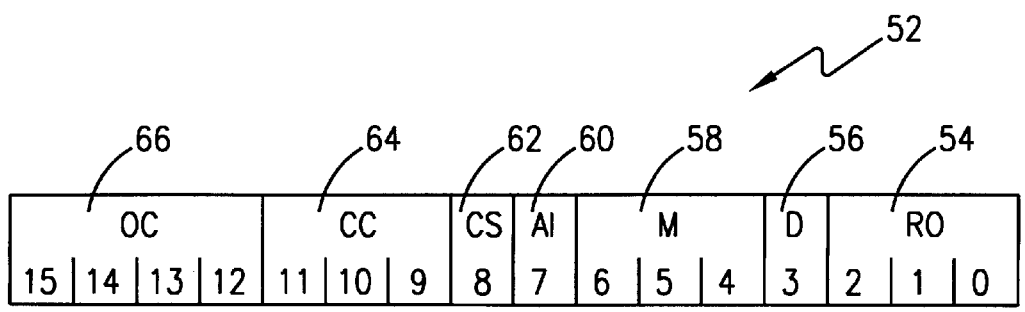
FIGS. 7A, 7B, 7C, 7D, 7E, 7F, 7G, 7H, 7I, and 7J illustrate instruction word formats for use with the coprocessing core.
Figure 7B:
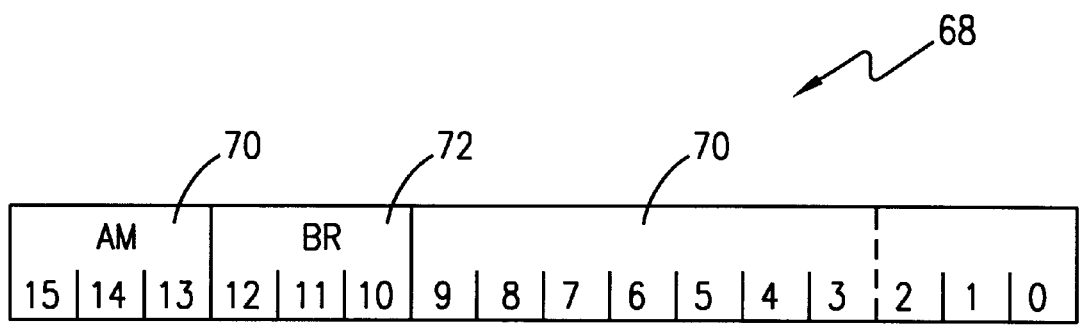

Reference is now made to FIGS. 7A and 7B wherein there are illustrated two instruction word formats for use with the coprocessing core 16. For simplicity of processing design and operation, one of the operands in these two-operand instructions must be a source or a destination register. With specific reference now to the first instruction word format 52 illustrated in FIG. 7A, the instruction word includes a register operand (RO) field 54 specifying with three bits the relative register (R2–R7) currently in use. The instruction word format 52 further includes a destination (D) indicator 56 comprising a single bit that is set if the register operand 54 is to be used as a destination, and is clear if it is to be used as a source. A mode (M) field 58 comprising three bits specifies the addressing mode to be used, wherein zero specifies absolute addressing (with the next word following the instruction identifying the address), one indicates that a second instruction word is needed, and two through seven indicate register mode for the relative registers (R2–R7). The instruction word format 52 further includes a single bit program counter auto-increment (AI) indicator 60 that defaults to set, and wherein set indicates automatic incrementation of the program counter after the completion of the instruction. A single bit context switching (CS) indicator 62 is also included for designating the performance of a context switching operation by incrementing the base pointer 20 by one. The instruction word format 52 still further includes a three bit condition code (CC) field 64 specifying condition flag status to be tested on the control status register (R1) with respect to carry (C) set, carry clear, zero (Z) bit set, zero bit clear, negative (N) set, and negative clear. Lastly, an operation code (OC) field 66 indicating the type of instruction in use is included in the word format 52, wherein: operation code 0–10 indicates instructions using basic format, operation code 11–14 indicates instructions using alternate formate (see FIGS. 7C–7I); and operation code 15 indicates instructions using extended format. (See, FIG. 7J).

With specific reference now to the second instruction word format 68 illustrated in FIG. 7B, the instruction word includes an addressing mode (AM) field 70 whose value is: zero for register indirect addressing (with a displacement set by the value of field 70); one for register index addressing mode (with the least three significant bits (field 70) specifying the indexing register R2–R7); two for register indirect addressing mode (with the register in use being the base register (BR) field 72); three for register indirect addressing with postincrement; and, four for register indirect addressing with predecrement.

Figure 7C:
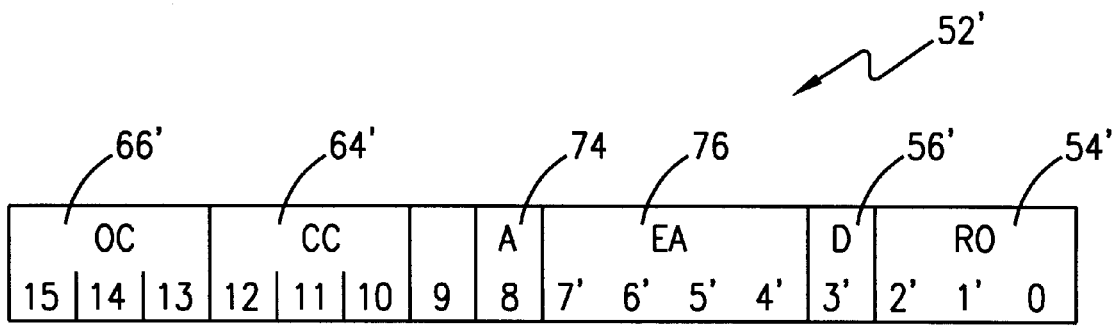

Reference is now made to FIG. 7C wherein there is shown a first alternate instruction word format 52' to that shown in FIG. 7A. One specific type of instruction executed by the coprocessing core 16 utilizes this alternate word format 52'. This instruction has an operation code (OC=11) 66' that specifies a conditional branch (bcc) instruction with the condition on which to branch being specified in the CC field 64'. If the A indicator 74 is clear, the effective address is made relative to the current program counter (R0) value plus or minus an eight bit value contained in bits zero to seven of the instruction (the EA field 76). If the A indicator 74 is instead set, the effective address is given by the EA field 76 wherein: zero is an absolute addressing branch (with the address given in the next instruction word); two through seven designate register indirect addressing for relative registers R2–R7; and one and any other value are not used.

Figure 7D:
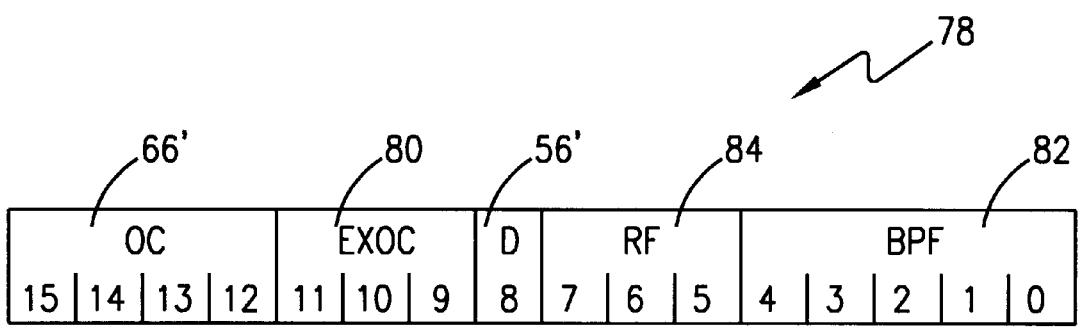
Figure 7E:
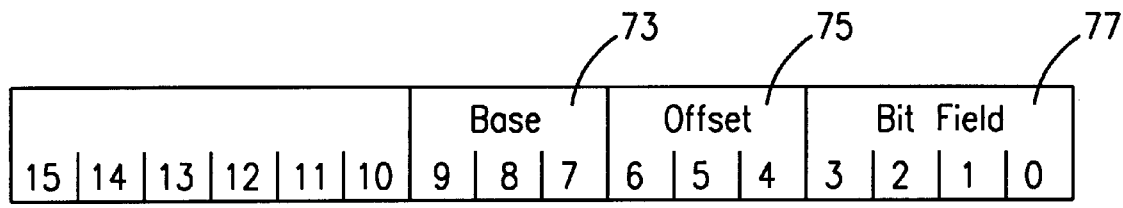

Reference is now made to FIG. 7D wherein there is shown a second alternate instruction word format 52" to that shown in FIG. 7A. One specific type of instruction executed by the coprocessor core 16 utilizes this alternate word format 52". This instruction has an operation code (OC=12) 66' that specifies a load to or from bit field (ldbf) instruction. The D indicator 56' indicates whether the register operand 54' contains the destination register or source register (read operation). This instruction needs an additional word (FIG. 7E) to provide information on the base address 73, offset address 75, and field size 77.

Figure 7F:
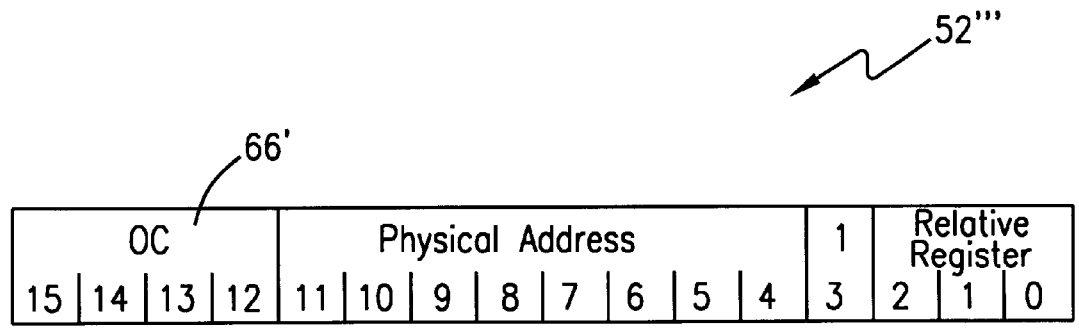
Figure 7G:
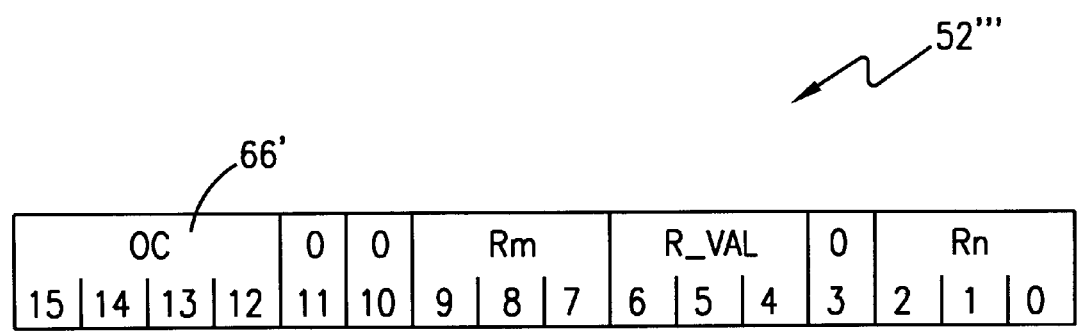
Figure 7H:
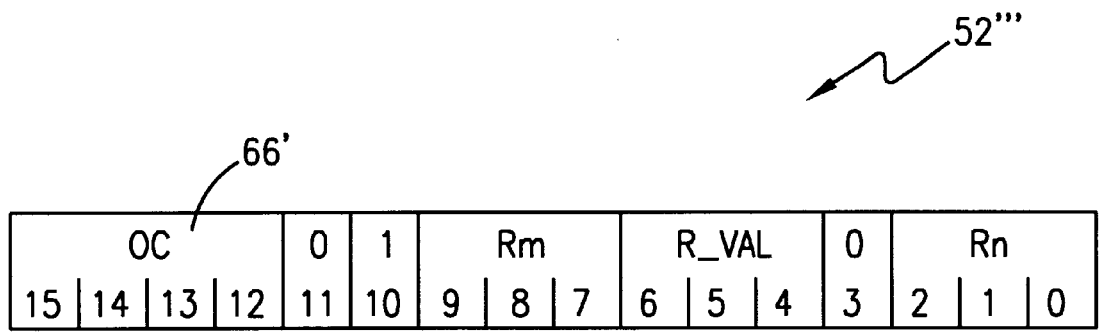
Figure 7I:
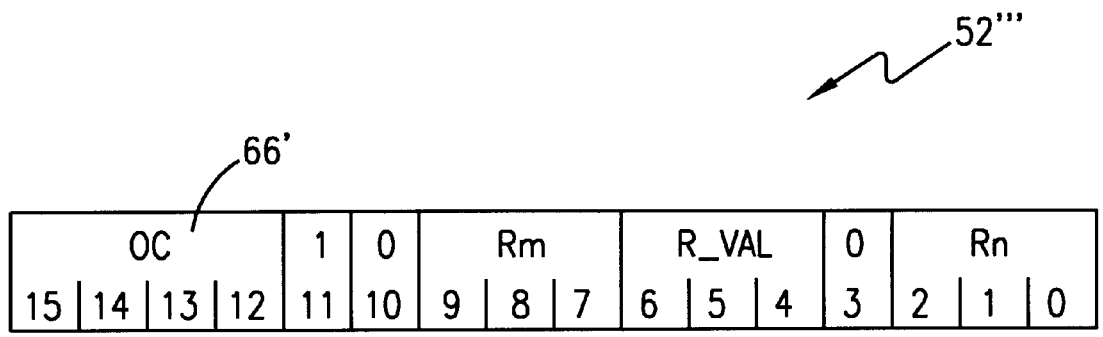

Reference is now made to FIGS. 7F–7I wherein there are shown third alternative instruction word formats 52''' to that shown in FIG. 7A. One specific type of instruction (having four different formats) executed by the coprocessor core 16 utilizes these formats. This instruction has an operation code (OC=13) 66' that and specifies a read from absolute register (rdar) instruction. In FIG. 7F, the format specifies direct addressing mode for the instruction designated by the syntax "@ddress, R0" wherein @ddress value is referred to the absolute register in the register block. FIG. 7G has a format specifying register indirect addressing mode for the instruction designated by the syntax "@Rm, Rn" wherein Rm contains the eight-bit address of the addressed absolute register in the register block. In FIG. 7H, the format is for an instruction designated by the syntax "R-VAL, Rn" wherein the assumed previous value of the base pointed, together with R-VAL, specifies the relative register associated with the previous base pointer. FIG. 7I discloses a format for an instruction having the syntax "(rm), Rn" wherein the previous base pointer value is assumed, and (Rm) contains the relative register value associated with the previous base pointer. The values of bits 3, 10 and 11 distinguish between the formats of FIGS. 7F–7I.

Figure 7J:
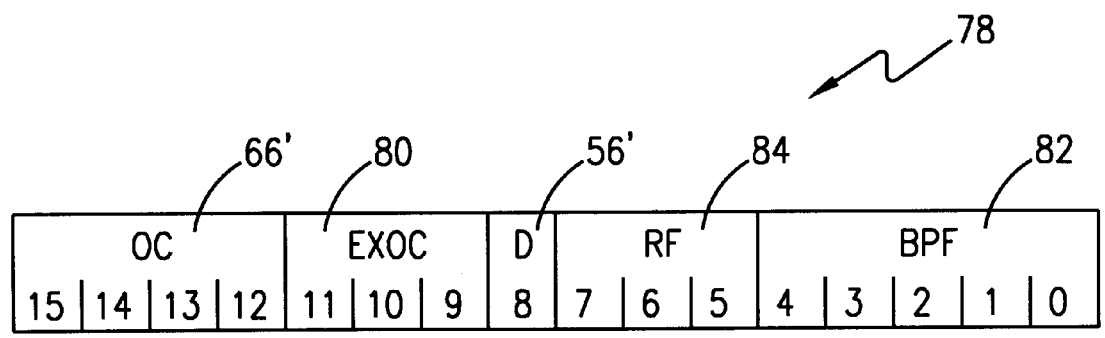

Reference is now made to FIG. 7J wherein there is shown an extended instruction word format 78 used when the operation code (OC) 66' is set to fifteen. The word format 78 includes an extended operation code (EXOC) field 80 having a value of: zero for a disable interrupt (dsi) instruction (wherein no other fields are used); one for an enable interrupt (eni) instruction (wherein no other fields are used); two for a return (ret) from function call instruction; three for a return (reti) from interrupt service function instruction; four for a switch context (swx) with new base pointer in base pointer field instruction; and, five for a function call (call) instruction (wherein the base pointer field (BPF) 82 contains the destination base pointer value). If the D indicator 56' is set, then the register field (RF) 84 contains the address of the called function. If the D indicator 56' is instead clear, then the address is supplied with the next instruction word.

The instruction set supported by the coprocessing core 16 using the formats of FIGS. 7A–7J is given in Table 1.

TABLE 1

INSTRUCTION SET

| Instruct. | Opcode | EX code | Description |
|---|---|---|---|
| ld | 0 | NO | load instruction, for data movement |
| and | 1 | NO | logical AND instruction |
| or | 2 | NO | logical OR instruction |
| xor | 3 | NO | logical eXclusive OR instruction |
| add | 4 | NO | addition |
| sub | 5 | NO | subtraction |
| mul | 6 | NO | multiplication, 16 bit result max. |
| div | 7 | NO | simple division, no remainder. |
| cmp | 8 | NO | unsigned comparition. |
| lsl | 9 | NO | logical shift left |
| lsr | 10 | NO | logical shift right |
| bcc | 11 | NO | conditional branch |
| ldbf | 12 | NO | load bit field to / from register |
| rdar | 13 | NO | read absolute register |
| dsi | 15 | 0 | disable interrupt |
| eni | 15 | 1 | enable interrupt |
| ret | 15 | 2 | return from function |
| reti | 15 | 3 | return from interrupt service |
| swx | 15 | 4 | switch context with new BP |
| call | 15 | 5 | function call instruction. |

Reference is now again made to FIG. 1 for a further description of the functional components of the controller 10 connected to the coprocessing core 16. The controller 10 is designed to provide a flexible and programmable data interface between the host processing system 12 and the plurality of peripheral devices 14.

The host processing system 12 includes a host processor 86 and a host memory 88 connected to a host processing bus 90. The coprocessing core 16 is connected to the host processing bus 90 via its own internal bus 92 and a host bus interface 94 designed to conform to the bus interface requirements of the host processing bus. Through the host bus interface 94, the controller 10 is given access to the host processor bus 90 (and the host memory 88 connected thereto), and the host processor 86 is given access to the internal bus 92 of the controller. An internal random access memory (RAM) 95 is also connected to the internal bus 92, and is normally used store read and write variables for the coprocessing core 16 but may also be used to store programming (in particular that programming downloaded from the host processing system).

The peripheral devices 14 are connected to the controller 10 via a coprocessor external bus 96. The coprocessing core 16 is connected to the bus 96 via its own internal bus 92 and a coprocessor bus interface 98 designed to conform to the interface requirements of the peripherals. Through the coprocessor bus interface 98, the controller 10 is given access to the bus 96 (and the peripheral devices 14 and optional external memory 100 attached thereto), and the peripheral devices are given access to the internal bus 92 of the controller.

A further connection of the peripheral devices 14 to the controller 10 is made via an interrupt and input/output control device 102 which supports the bus 96 and the coprocessor interface 98. The interrupt and input/output control device 102 performs two main functions. First, the interrupt and input/output control device 102 generates interrupt interface signals transmitted to the coprocessing core 16 and peripherals 14 over link 104. The interface 98 connection to the bus 96 includes a plurality of ports 106 each programmed with a unique five bit interrupt vector value pointing, via indirect addressing as discussed above, to an independent interrupt service function to be executed by the coprocessing core 16. In operation in accordance with this first function, interrupt and input/output control device 102 determines which port 106 needs to interrupt the coprocessing core 16 and retrieves the unique vector for that port. An interrupt request is then forwarded over link 104 to the coprocessing core 16 along with the retrieved vector. The coprocessing core 16 then acknowledges the interrupt back to the interrupt and input/output control device 102 and the vector is applied to the base pointer 20 to initiate the interrupt service routine in an efficient manner discussed above.

The second function performed by the interrupt and input/output control device 102 is the controlling of input and output through the connection on link 104 with the peripherals 14. Each port 106 on bus 96 utilizes three independently configurable external signals, with the configuration dictated by the mode of input/output operations specified by the coprocessing core 16. In general purpose input and output, the external signals are independently configured and input and output timing is conformed and controlled by the coprocessing core 16. In serial input and output, asynchronous, bit transparent and synchronous serial transmission is supported with the three external signals specifying input, output and bit timing. In direct memory access (DMA) interface, the three external signals specify DMA read request (input), DMA write request (input) and DMA acknowledge (output).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An input/output controller for connection between a host processing system and plural peripheral devices, comprising:
    a host interface for providing a connection to the host processing system;
    a peripheral interface including multiple ports each providing a connection to at least one peripheral device; and
    a coprocessing core, connected to both the host interface and the peripheral interface, the coprocessing core specially programmed to handle data capturing and data formatting/deformatting with respect to each of the peripheral devices connected to the multiple ports of the peripheral interface, said coprocessing core comprising:
        a register block comprising a plurality of registers, the plurality of registers divided into a plurality of sub-blocks;
        a base pointer whose value points to a particular one of the plurality of sub-blocks for coprocessor core access to each of the registers in that particular sub-block, wherein changing of the value of the base pointer brings another one of the sub-blocks and registers therein into coprocessing core access; and
        wherein one of the registers in each sub-block stores a program counter identifying a next instruction to be executed by the coprocessing core when the value of the base pointer points to the sub-block where that program counter register is located.

2. The input/output controller as in claim 1 wherein each port of the peripheral interface is assigned a unique interrupt vector and the peripheral interface further includes means responsive to an interrupt need of any of the peripheral devices for signaling the interrupt to the coprocessing core and applying to the coprocessing core the unique interrupt vector for the port to which the interrupt needy peripheral device is attached.

3. The input/output controller as in claim 2 wherein the coprocessing core further responds to the signaled interrupt by executing an interrupt service function corresponding to the applied interrupt vector.

4. The input/output controller as in claim 1 wherein one of the registers in each sub-block stores a current value for the base pointer and an immediately prior value for the base pointer, the immediately prior value identifying an immediately prior sub-block in the register block to which read-write access was granted to the coprocessing core.

5. The input/output controller as in claim 4 wherein the immediately prior sub-block is related to a return from a function call or interrupt service routine executed by the coprocessing core.

6. A non-stacked machine architecture for a processor comprising:
    a register block comprising a plurality of registers, the plurality of registers divided into a plurality of sub-blocks;
    a base pointer whose value points to a particular one of the plurality of sub-blocks for processor access to each of the registers in that particular sub-block, wherein changing the value of the base pointer brings another one of the sub-blocks and registers therein into processor access and restricting processor access to a prior one of the sub-blocks and registers: and
    wherein one of the registers in each sub-block stores a current value for the base pointer and an immediately prior value for the base pointer, the immediately prior value identifying an immediately prior sub-block in the register block to which read-write access was granted to the coprocessing core.

7. The architecture as in claim 6 wherein one of the registers in each sub-block stores a program counter identifying a next instruction to be executed by the coprocessing core when the value of the base pointer points to the sub-block wherein that program counter register is located.

8. The architecture as in claim 6 wherein the immediately prior sub-block is related to a return from a function call or interrupt service routine executed by the processor.

9. The architecture as in claim 6 wherein the processor responds to a received interrupt indication by applying a received interrupt vector value as the value of the base pointer, the interrupt vector value specifying a particular one of the sub-blocks in the register block relating to the execution of a interrupt service function by the processor.

10. A processing method, comprising the steps of:
    providing a register block for a processor, the register block including a plurality of registers therein;
    dividing the register block into a plurality of sub-blocks, each sub-block including a set of the registers;

providing a base pointer;

linking certain values loaded into the base pointer with corresponding sub-blocks;

accessing a certain one of the sub-blocks of the register block by loading the certain value corresponding to that certain sub-block into the base pointer; and reading from or writing to the set of registers in the certain accessed sub-block.

11. The method of claim 10 wherein the step of reading or writing includes the step of selecting a particular one of the registers in the set of registers in the accessed sub-block from which to read or to which to write.

12. The method of claim 10 wherein the step of accessing comprises the step of switching from a first sub-block having a first corresponding base pointer value to a second sub-block having a second corresponding base pointer value by loading the second corresponding base pointer value into the base pointer.

13. The method of claim 12 further including the step of saving the first corresponding base pointer value in one of the registers in the set of registers for the second sub-block corresponding to the second corresponding base pointer value.

14. The method as in claim 13 wherein the step of accessing is executed in response to an interrupt service request or a function call, and the first corresponding base pointer value stored in the second sub-block provides a return after completion of a processing execution related to the second sub-block.

15. The method as in claim 10 wherein one of the registers in each set of registers stores a program counter value identifying a next step to be executed in a processing execution relating to each sub-block.

16. In a processor having a register block with a plurality of registers, the plurality of registers divided into a plurality of sub-blocks, and having a base pointer whose loaded value identifies for processor access a certain one of the sub-blocks, a method for addressing of the register block comprising the steps of:

storing in the registers of each sub-block processing data relating to a different processor task; and accessing a certain one of the processor tasks by loading into the base pointer the value identifying the sub-block corresponding to that certain processor task, said accessing step further comprising the step of:

switching from a first sub-block having a first corresponding base pointer value relating to a first processor task to a second sub-block having a second corresponding base pointer value relating to a second processor task by loading the second corresponding base pointer value into the base pointer.

17. The method as in claim 16 wherein the step of accessing is executed in response to an interrupt service request including an interrupt service vector value, and the step of accessing includes the step of loading the interrupt service vector value into the base pointer, the interrupt service vector value identifying the sub-block corresponding to an interrupt service processor task.

18. The method as in claim 17 further including the step of storing the base pointer value corresponding to the certain processor task in one of the registers of the sub-block corresponding to the interrupt service processor task to provide a return to the sub-block for the certain processor task following completion of the interrupt service processor task.

19. The method of claim 16 further including the step of saving the first corresponding base pointer value in one of the registers for the second sub-block to provide a return, if necessary, to the first processor task following completion of the second processor task.

20. An input/output controller for connection between a host processing system and plural peripheral devices, comprising:

a host interface for providing a connection to the host processing system;

a peripheral interface including multiple ports each providing a connection to at least one peripheral device; and a coprocessing core, connected to both the host interface and the peripheral interface, the coprocessing core specially programmed to handle data capturing and data formatting/deformatting with respect to each of the peripheral devices connected to the multiple ports of the peripheral interface, said coprocessing core comprising:

a register block comprising a plurality of registers, the plurality of registers divided into a plurality of sub-blocks;

a base pointer whose value points to a particular one of the plurality of sub-blocks for coprocessor core access to each of the registers in that particular sub-block, wherein changing of the value of the base pointer brings another one of the sub-blocks and registers therein into coprocessing core access; and wherein one of the registers in each sub-block stores a current value for the base pointer and an immediately prior value for the base pointer, the immediately prior value identifying an immediately prior sub-block in the register block to which read-write access was granted to the coprocessing core.

21. A non-stacked machine architecture for a processor comprising:

a register block comprising a plurality of registers, the plurality of registers divided into a plurality of sub-blocks;

a base pointer whose value points to a particular one of the plurality of sub-blocks for processor access to each of the registers in that particular sub-block, wherein changing the value of the base pointer brings another one of the sub-blocks and registers therein into processor access and restricting processor access to a prior one of the sub-blocks and registers; and wherein one of the registers in each sub-block stores a program counter identifying a next instruction to be executed by the coprocessing core when the value of the base pointer points to the sub-block wherein that program counter register is located.

* * * * *